(12) United States Patent
Ezumi et al.

(10) Patent No.: US 6,311,889 B1
(45) Date of Patent: Nov. 6, 2001

(54) MANUFACTURING METHOD OF A STRUCTURE BODY AND A MANUFACTURING APPARATUS OF A STRUCTURE BODY

(75) Inventors: Masakuni Ezumi; Kazusige Fukuyori, both of Kudamatsu; Akihiro Satou, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/564,502

(22) Filed: May 4, 2000

(30) Foreign Application Priority Data

May 28, 1999 (JP) .................................................. 11-149135

(51) Int. Cl.$^7$ ...................................................... B23K 20/12
(52) U.S. Cl. ....................... 228/112.1; 156/73.5; 228/119
(58) Field of Search ........................... 228/2.1, 13, 112.1, 228/114.5, 119; 156/73.5; 219/121.63, 121.64, 121.83, 124.34

(56) References Cited

U.S. PATENT DOCUMENTS 4,083,323 * 4/1978 Rote .
4,988,201 * 1/1991 Sugitani et al. .
5,794,835 * 8/1998 Colligan et al. .
6,050,474 * 4/2000 Aota et al. .
6,068,178 * 5/2000 Michisaka .

FOREIGN PATENT DOCUMENTS 9-309165 * 12/1997 (JP) .
10-175089 * 6/1998 (JP) .

* cited by examiner

*Primary Examiner*—Tom Dunn
*Assistant Examiner*—Jonathan Johnson
(74) *Attorney, Agent, or Firm*—Antonelli, Terry, Stout & Kraus, LLP

(57) ABSTRACT

A friction stir welding apparatus 1a comprises members 20 and 30 to be subjected to a friction stir welding which members are fixed on a table 5, and a joining welding head 200 which moves in an arrow mark A direction along the table 5. A rotary tool 10 performs the friction stir welding so that a welding bead 50 is formed. A sensor 210 irradiates a light beam 212 on the area to be welded and detects edge portions 24 and 34 of the members, and the welding head 200 is moved and controlled to follow the center of the welded joint. A burr removing cutting means 12 of the rotary tool 10 operates to cut off the burr from the weld, causing chips 60 to be formed. An air jet J injected from an air nozzle is discharged to the outside from a cover 230, whereby entry of the chips 60 into the area of the sensor 210 can be prevented. In a friction stir welding apparatus, the entry of chips into the area of the sensor 210 for detecting a center position where the welding joint is located can be prevented.

15 Claims, 5 Drawing Sheets

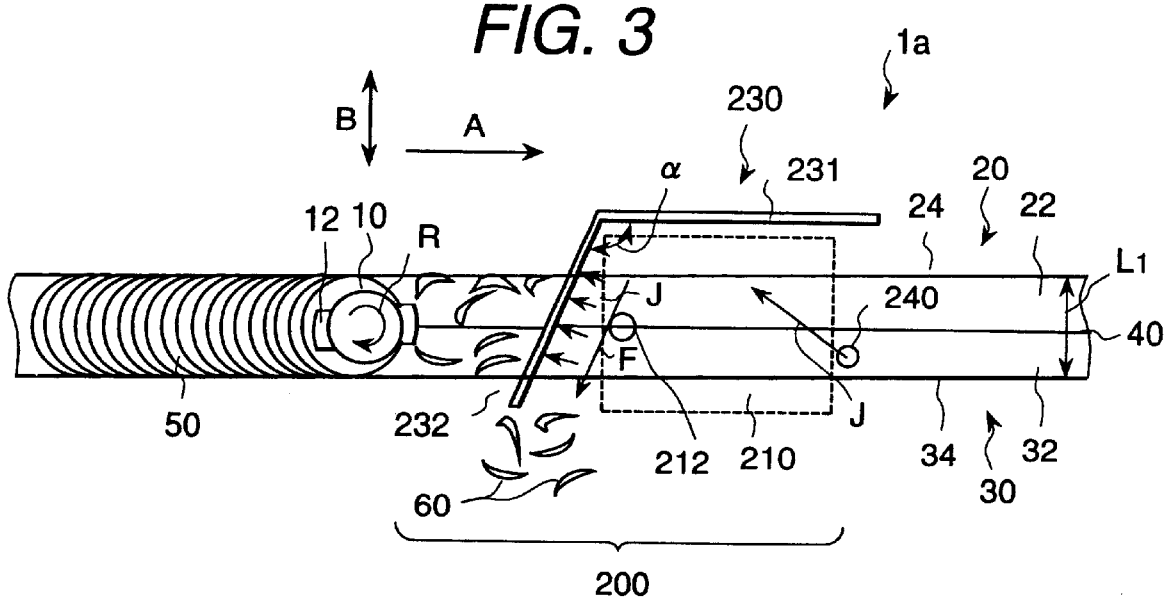
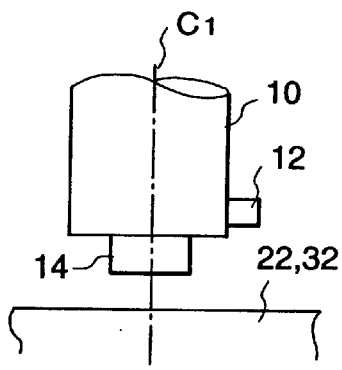
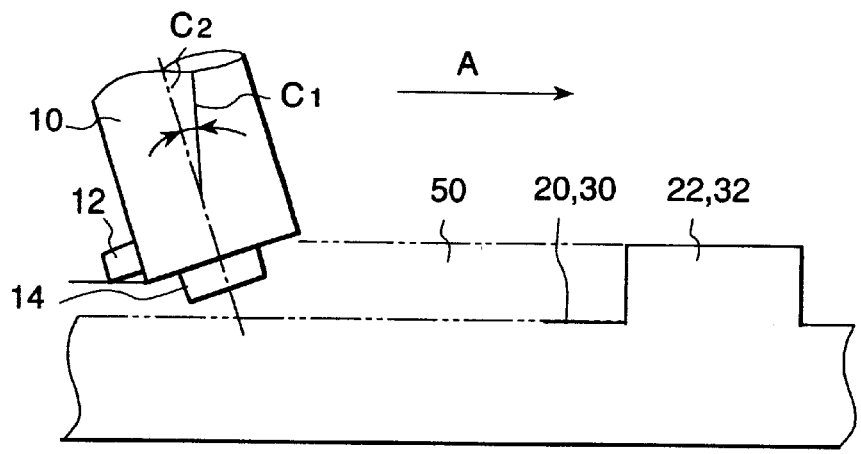

MANUFACTURING METHOD OF A STRUCTURE BODY AND A MANUFACTURING APPARATUS OF A STRUCTURE BODY

BACKGROUND OF THE INVENTION

The present invention relates to a method of manufacturing a structural body and an apparatus therefor; and, more particularly, the invention relates to a friction stir method of welding elements of a structural body and a friction stir welding apparatus therefor.

Two members to be subjected to friction stir welding have a raised portion at one side thereof where they are abutted, and, from a side of the raised portion, a rotary tool is inserted into a joint between the members and then a friction stir welding is carried out. In friction stir welding, when a gap exists between two members to be subjected to the friction stir welding process, a reduced thickness of the two members by the material contributed by the raised portion is compensated.

After the friction stir welding, the remainder of the raised portion of the two members that is no longer needed is cut off and removed in such a way that the outer face of the member formed by friction stir welding is flat and smooth. This technique is disclosed in Japanese application patent laid-open publication No. Hei 09-309164 (EP 0797043 A2).

Further, a cutter may be provided which operates in a radial direction of the rotary tool. The small diameter portion of the rotary tool is inserted into the joint between the members and a boundary formed between the large diameter portion and the small diameter portion of the rotary tool is brought into contact with the members to be subjected to the friction stir welding. The cutter projects toward a side of the large diameter portion of the rotary tool from the boundary. This cutter can cut off or delete a burr which is generated as a result of the friction stir welding. This technique is disclosed in Japanese application patent laid-open publication No. Hei 10-71477 (U.S. Pat. No. 5,794,835, EP 0810055 A1).

Further, the rotary tool and the cutter may be provided separately, and, as the cutter, an end milling member may be used. This technique is disclosed in Japanese application patent laid-open publication No. Hei 10-175089.

When the members having a raised portion along one side thereof are subjected to friction stir welding, a burr is typically generated at the welding joint. Further, at least a part of the raised portion of the member subjected to the friction stir welding is left. In a case where the raised portion is formed on the outer face of a structural body, it is necessary to remove the residual raised portion. Thus, to the rotary tool, a cutter is attached to cut off any excessive raised portion and the burr on the weld joint as the welding occurs. However, such cutting tends to produce chips, the existence of which makes it difficult to carry out a good friction stir welding.

The above-stated considerations will be explained in more detail. To a front portion in an advancing direction of the rotary tool, an optical sensor is provided for detecting optically the raised portion of the member being subjected to the friction stir welding. This optical sensor can detect the width of the two abutting raised portions of the members, and thereby guide the rotary tool to a position at the center thereof where the welding joint is located. Further, the optical sensor can detect the height of the raised portion of the members, and, subject to that determination, the amount the rotary tool should be inserted into the joint of the members to be welded can be determined suitably. However, the detection range of the optical sensor is affected when chips enter the working area, making it impossible to carry out a precise detection.

Further, at a front portion and at a rear portion of the rotary tool, rollers are installed, which rollers ride on the surface of the raised portion of the members being subjected to friction stir welding or the vicinity of the raised portion relative to a bed. Since chips collect at the rear portion of the rotary tool, the chips tend to obstruct movement of the rear roller. For this reason, the member being subjected to the friction stir welding is likely to be damaged due to the presence of these chips.

SUMMARY OF THE INVENTION

An object of the present invention is to provide a method of manufacture of a structural body and a manufacturing apparatus therefor, as well as to a friction stir welding method for forming a structural body and a friction stir welding apparatus wherein a good structural body can be obtained.

Another object of the present invention is to provide a method of manufacture of a structural body and a manufacturing apparatus therefor, using a friction stir welding method, wherein a structural body having a small raised portion can be obtained.

The above stated objects can be attained be provision of a cutting means and a sensing means in an arrangement in which air is caused to flow out from a front portion in a moving direction toward a rear portion or in a lateral direction relative to the moving direction to clear away any chips.

The above stated objects can be attained by using a cutter which has a rotation radius larger than the width of the raised portion of the structural body.

The above-stated objects can be attained by way of a manufacturing method including the steps of relatively moving a cutting means along a welding joint while guiding said cutting means in response to a sensing means for detecting the location of said welding joint, cutting excess material from said welding joint, and directing an air flow from a front portion in said moving direction to a rear portion or from a lateral direction toward said moving direction across the welding, portion to clear away chips and other foreign matter.

The above stated objects can be attained by a manufacturing, method including the steps of guiding a cutting means in response to a sensing means for detecting, the location of a welding joint and cutting off an excess portion of said welding joint, directing an air flow toward a rear portion of said sensing means from a side of a front portion in an advancing direction of said sensing means toward the rear portion of said sensing means.

The above stated objects can be attained by a friction stir welding apparatus which comprises a bed for fixing members to be subjected to a welding, a head for carrying out a friction stir welding said members by moving along a joint between said members over said bed, said head comprising a rotary tool for effecting friction stir welding, cutting means for removing burrs, a sensing means provided at a front portion in an advancing direction of said rotary tool for detecting a center position where a welding joint is located, a cover for covering a housing of said sensing means, and an air nozzle for injecting an air jet against said cover.

BRIEF DESCRIPTION OF DRAWING

FIG. 3 is a plan view of the friction stir welding apparatus of FIG. 2;

FIG. 4 is an explanatory diagram showing a relationship between a rotary tool and members to be subjected to friction stir welding;

FIG. 5 is an explanatory diagram showing a relationship between a rotary tool and members to be subjected to friction stir welding;

DESCRIPTION OF THE INVENTION

Figure 1:
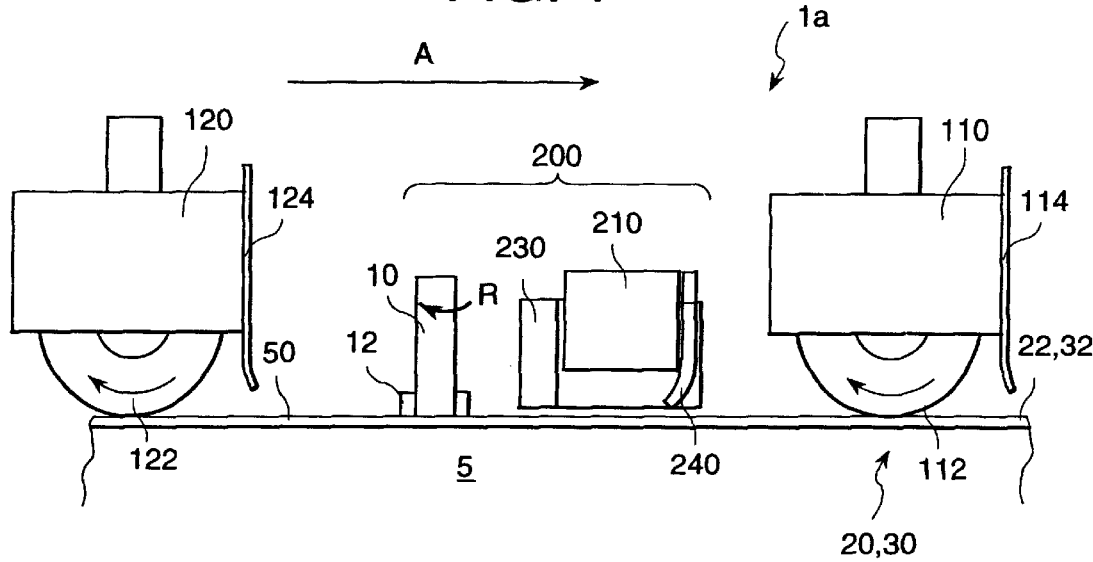
FIG. 1 is a side view of a friction stir welding apparatus for a structural body according to the present invention.

FIG. 1 is a side view showing an apparatus for the manufacture of a structural body, using a friction stir welding method according to the present invention.

A friction stir welding apparatus for the manufacture of a structural body, as indicated by reference numeral 1a, comprises a table 5 on which two members 20 and 30 to be subjected to friction stir welding are mounted, and a welding head 200 which moves in an arrow mark A direction across the table 5 with a first pressing roller unit 110 which is provided at a front portion of the welding head 200 and a second pressing roller unit 120 which is provided at a rear portion of the welding head 200.

The first pressing roller unit 110 is arranged at a front portion in an advancing direction relative to the welding head 200 and a rotation roller 112 presses down on the upper faces of non-welding raised portions 22 and 32 of the members 20 and 30 to be subjected to the friction stir welding.

The first pressing roller unit 110 has an air nozzle 114, and this air nozzle 114 operates to remove foreign matter from the area of the friction stir welding. Further, the first pressing roller 110 can remove foreign matter from the rolling face of the rotation roller 112. The injection direction of an air jet produced by the air nozzle 114 is a forward direction of movement indicated by the arrow A. Further, the injection direction of an air jet of the air nozzle 114 also can be a side direction transverse to the moving direction.

The second pressing roller unit 120 is arranged at a rear portion in the advancing direction of the welding head 200 and a rotation roller 112 presses down on an upper face of a welding bead 50. The second pressing roller unit 120 also has an air nozzle 124 and this air nozzle can remove chips etc. which are generated during the friction stir welding. Further, the second pressing roller 120 can remove foreign matter from a rolling face of the rotator roller 112. The injection direction of an air jet produced by the air nozzle 114 is a forward direction of movement indicated by the arrow A. Further, the injection direction of an air jet of the air nozzle 114 can be a side direction against to the moving direction.

Figure 2:
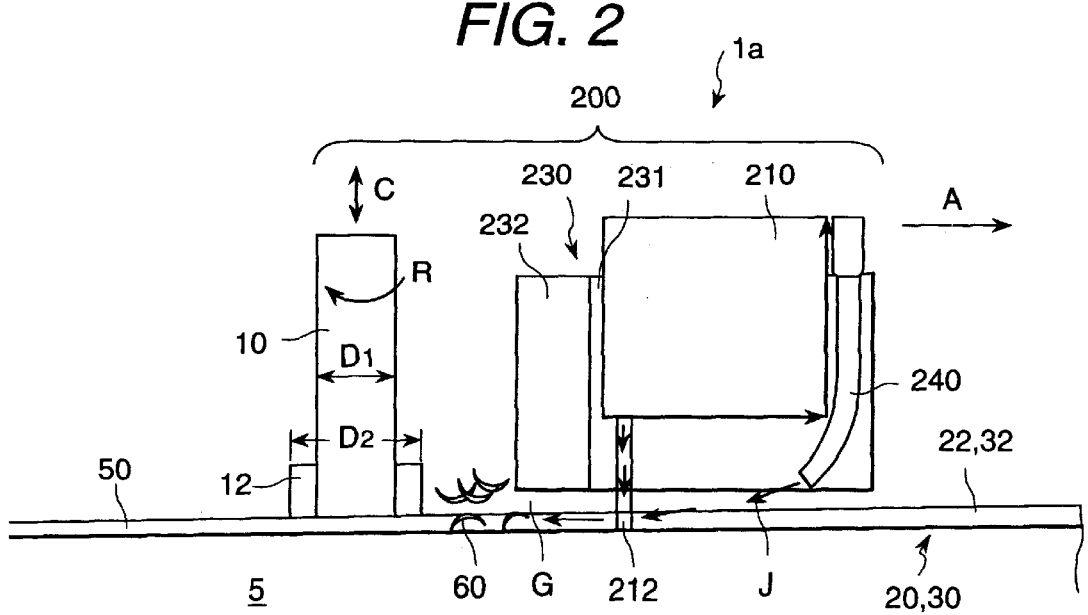
FIG. 2 is a side view showing an essential part of the friction stir welding apparatus of FIG. 1.

FIG. 2 is a side view showing the welding head of the friction stir welding apparatus and FIG. 3 is a plan view showing the welding head from above the friction stir welding apparatus.

The welding head 200 of the friction stir welding apparatus 1a moves in the arrow mark A direction across the table 5 and also is controlled against movement in a direction B orthogonal to the advancing direction and in a height direction C.

On the table 5, a first member 20 and a second member 30 to be joined by friction stir welding are installed with contacting or abutting side faces. The first member 20 has a raised portion 22 along one side thereof and the second member 30 has a raised portion 32 along one side thereof.

The welding head 200 comprises a rotary tool 10 and an optical sensor 210. The rotary tool 10 moves in the arrow mark A direction while rotating in an arrow mark R direction and carries out friction stir welding in the joint between the members 20 and 30 so that a welding bead 50 is formed. The rotary tool 10 has a burr removing cutter 12, and this cutter 12 operates to cut off the burr etc. which is generated during the friction stir welding, resulting in chips 60 being scattered in the area of the welding bead.

The optical sensor 210 provided on the welding head 200 has a box shaped housing and is shielded by a cover or partitioning member 230. The cover 230 covers one of the side faces of the optical sensor 210 and a trailing face which faces the rotary tool 10. At a position which is on the opposite side relative to the rotary tool 10 of the housing of the welding head 200, an air nozzle 240 is installed.

The optical sensor 210 projects a light beam 212 onto the upper faces of the members 20 and 30 to be subjected to friction stir welding and detects optically the positions of the edge portions 24 and 34 of the raised portions 22 and 32 of the members 20 and 30. In accordance with the information provided by this optical sensor 210, the welding head 200 is moved and controlled in the arrow mark B direction so that the center of the rotary tool 10 is guided along the center between both edge portions 24 and 34 of the raised portions 22 and 32 of the members 20 and 30 where the joint to be subjected to friction stir welding is located. Further, the optical sensor 210 detects the height of the raised portions 22 and 32 of the members 20 and 30. According to this detection, the welding head or a processing head 200 is moved and controlled in the arrow mark C direction, so that the insertion amount of the rotary tool 10 is maintained at a predetermined value.

The rotary tool 10 has the burr removing cutter 12 which operates to cut off the burr which is generated during the friction stir welding process, resulting in chips 60 being distributed in the area of the weld. Further, the apex sides of the raised portions 22 and 32 which remain after welding are cut off, adding to the production of chips 60. In response to the centrifugal force of the rotary tool 10, the chips 60 are dispersed in the surrounding area of the table 5.

A trailing face plate 232 of the cover 230 is folded at an obtuse angle α relative to the side face plate 231, which is disposed in parallel with the advancing direction of the welding head 200 and covers a side of the housing of the optical sensor 210. The trailing face plate 232 is inclined relative to the moving direction A.

An air jet J is injected from the air nozzle 240 toward an area of the side face plate 231 which is in the vicinity of the trailing face plate 232. The height position of the injection port of the air nozzle is near to the raised portion 32. The air jet J which flows toward the side face 231 of the cover 230 is deflected in the arrow mark F direction along the surface of face plate 232, so that the chips 60 are scattered toward an open side of the cover 230, as seen in FIG. 3. Accordingly, the chips 60 which have been disburred under the cover 230 can be discharged so as to clean the area under the optical sensor 210. At a side portion opposite the face plate 231, since there is no side face plate, the chips 60 which have entered in the area under the cover 230 can be discharged easily.

The air jet J is injected from the air nozzle 240, which is provided at the front of the housing of the optical sensor 210, and flows through a gap G which is formed below the rear face plate 232 of the cover 230 so as to remove the chips 60 which enter the area under the cover 230. However, the air nozzle for injecting the air jet J also may be provided at the side of the optical sensor 210. Further, the air jet J which has collided with a rear side of the face plate 232 of the cover 230 is deflected in an arrow mark F direction along the inside surface of the face plate 232 and blows off the chips 60 toward a side at which the cover 230 is open.

FIG. 4 shows the relationship between the rotation center axis C1 of the rotary tool 10 and the raised portions 22 and 32 of the members 20 and 30 to be subjected to the friction stir welding. At a tip end portion of the rotary tool 10, a small diameter portion 14 is provided, and at an outer peripheral portion of the large diameter portion, the burr removing cutter 12 is formed. FIG. 4 shows a condition in which the rotation center axis C1 of the rotary tool 10 is arranged at 90 degrees relative to the surfaces of the raised portions 22 and 32 of the members 20 and 30 to be subjected to the friction stir welding.

In a case of an actual friction stir welding process, as shown in FIG. 5, the rotation center axis C2 of the rotary tool 10 will be inclined at an angle of β to the line C1 which is perpendicular to the surfaces of the members to be welded. This angle β differs according to the friction stir welding conditions and is selected to be about 3 degrees.

Figure 6A:
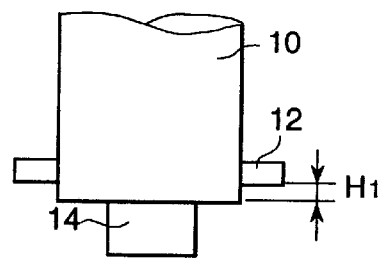
FIG. 6(A) is an explanatory diagram showing one construction of the rotary tool.
Figure 6B:
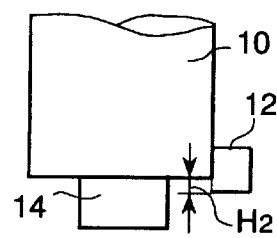
FIG. 6(B) is an explanatory diagram showing another construction of the rotary tool.

Each of FIG. 6(A) and FIG. 6(B) shows a positional relationship between the tip end of the large diameter portion of the rotary tool 10 and the burr removing cutter 12. FIG. 6(A) shows an arrangement in which the lower end of the cutter 12 is offset from the tip end of the large diameter portion of the rotary tool 10 by a dimension H1. FIG. 6(B) shows an arrangement in which the lower end of the cutter 12 is arranged to project by a dimension H2 from the tip end of the large diameter portion of the rotary tool 10. The position of the burr removing cutter 12 also can be set, for example, with the lower end of the burr removing cutter 12 aligned with the tip end of the large diameter portion.

Each of FIG. 7(A), FIG. 7(B), FIG. 7(C) and FIG. 7(D) shows a successive step in the formation of a bead during friction stir welding.

Figure 7A:
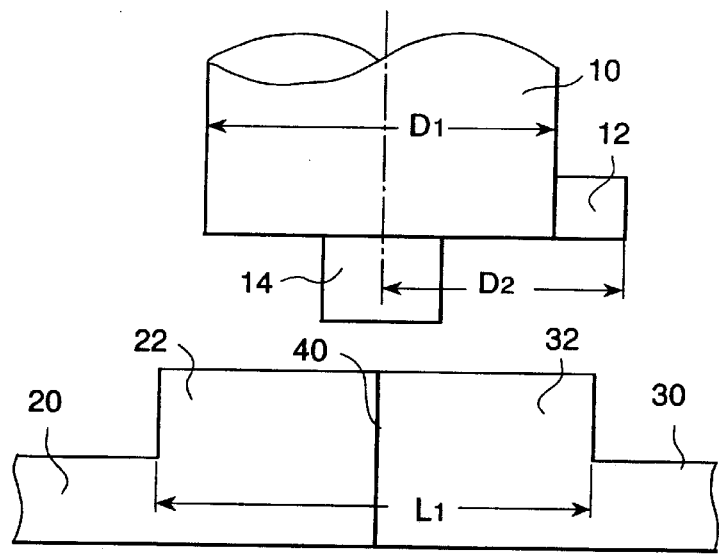
FIG. 7(A) is an explanatory diagram showing a relationship between a rotary tool and a friction stir welding portion of the members to be welded.

As shown in FIG. 7(A), the outer diameter D1 of the large diameter portion of the rotary tool 10 is smaller than the width L1 of the combined raised portions 22 and 32 of the members 20 and 30 to be subjected to the friction stir welding. And, the rotation diameter D2 of the burr removing cutter 12 is set to be larger than the width L1 of the combined raised portions 22 and 32 of the members 20 and 30 to be subjected to the friction stir welding.

Figure 7B:
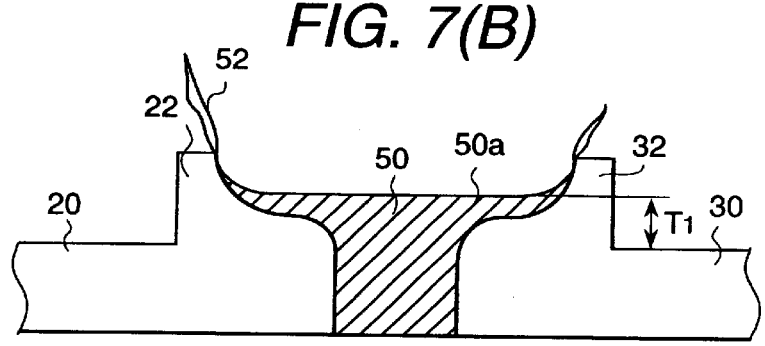
FIG. 7(B) is an explanatory diagram showing a welding portion of two members which have been subjected to friction stir welding.

As shown in FIG. 7(B), when the welding bead 50 is formed by the friction stir welding apparatus, a burr 52 is generated at both sides of the weld. With this condition as it is, the surface 50a of the welding bead 50 is positioned at a height T1 from the surface of the welded members 20 and 30.

Figure 7C:
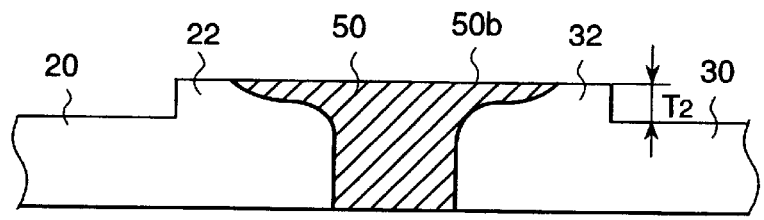
FIG. 7(C) is an explanatory view showing a welding joint of two members joined by friction stir welding.

FIG. 7(C) shows that, as the result of the operation of cutter 12, a portion of the surface 50a including the burr 52 is cut off, and a flat face 50b is formed at a height T2 from the surface of the welded members.

Figure 7D:
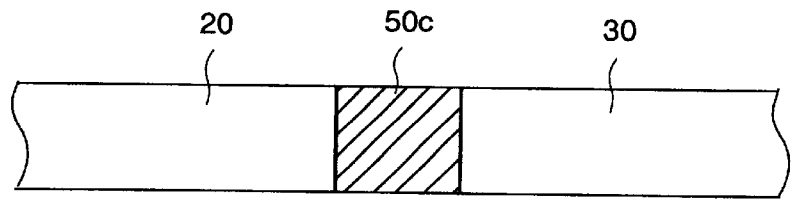
FIG. 7(D) is an explanatory diagram showing the completed weld in which two members have been joined by friction stir welding.

Further, as shown in FIG. 7(D), the above stated surface 50b is removed using a manual tool etc. and a flat face 50c coextensive with the faces of the welded members 20 and 30 can be obtained.

Figure 8:
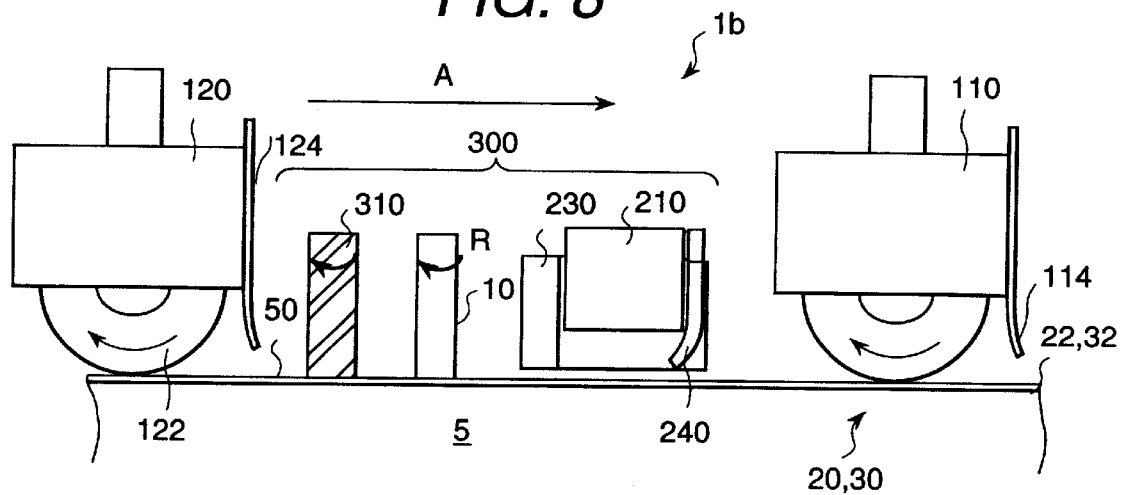
FIG. 8 is a side view showing another embodiment of a manufacturing apparatus, using a friction stir welding method for forming a structural body according to the present invention.

FIG. 8 shows another embodiment of a friction stir welding apparatus for forming a structural body according to the present invention. A welding head 300 of a friction stir welding apparatus 1b of this embodiment according to the present invention has the rotary tool 10, but this rotary tool 10 has no burr removing cutter. At a rear portion in the advancing direction of the rotary tool 10, a cutting tool 310, such as an end milling tool, is provided, and this cutting tool 310 removes the burr which has been generated at the welding bead.

Other constructions of the friction stir welding apparatus of this embodiment are similar to those of the former embodiment of the present invention as shown in FIG. 1.

Figure 9:
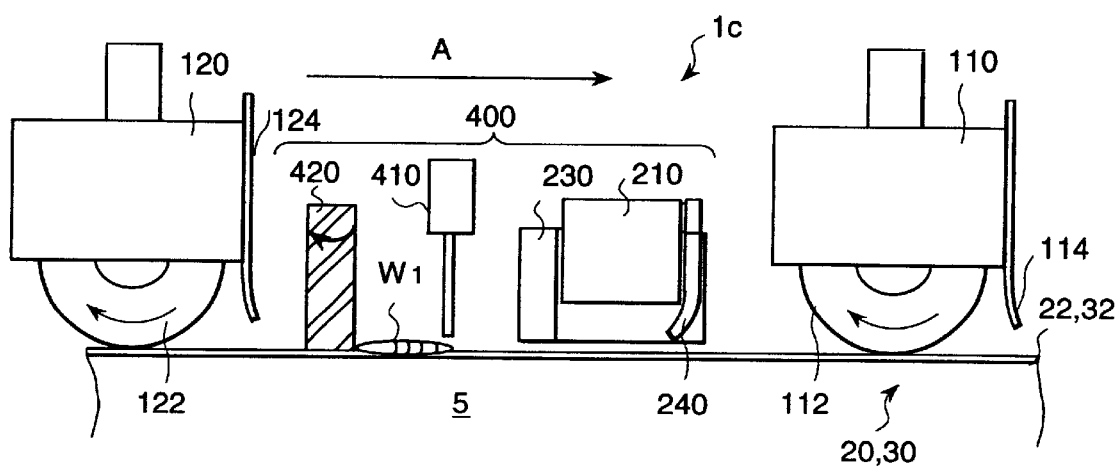
FIG. 9 is a side view showing another embodiment of a manufacturing apparatus, using a friction stir welding method for forming a structural body according to the present invention.

FIG. 9 shows a further embodiment of a friction stir welding apparatus for forming a structural body according to the present invention. The welding head 400 of the friction stir welding apparatus 1c of this embodiment has a welding torch 410 for forming a welding bead W1. Using a cutting tool 420, which is arranged at a rear portion of the welding torch 410, a surface of the welding bead W1 is cut off to form a flat face.

Other constructions of the friction stir welding apparatus of this embodiment are similar to those of the former embodiment of the present invention as shown in FIG. 1.

Figure 10:
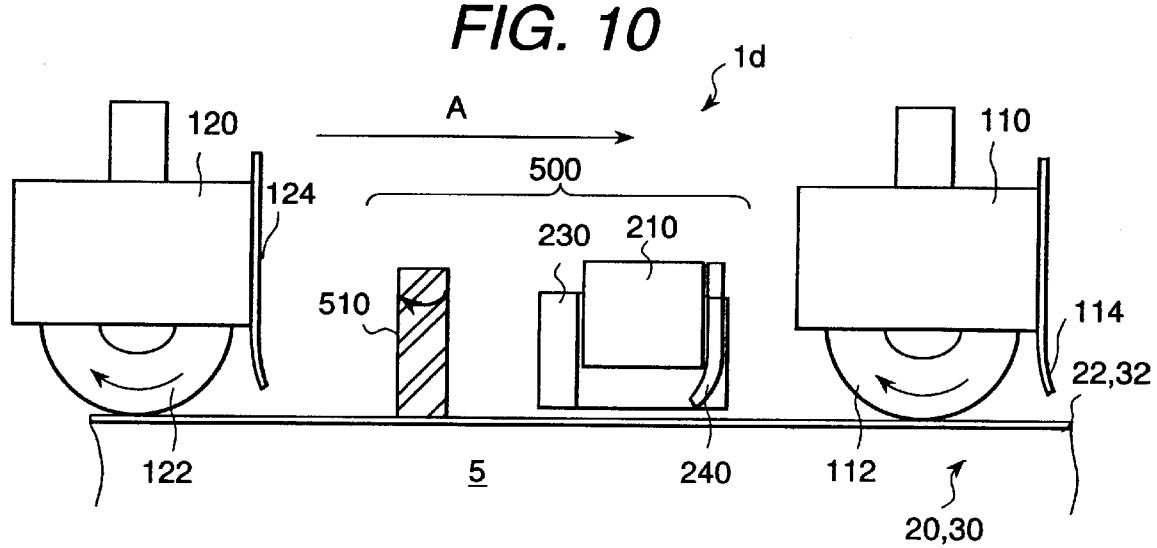
FIG. 10 is a side view showing a further embodiment of a manufacturing apparatus, using a friction stir welding method for forming a structural body according to the present invention.

FIG. 10 shows a further embodiment of a friction stir welding apparatus for forming a structural body according to the present invention. A welding head 400 of a friction stir welding apparatus 1d of this embodiment has a cut-off tool 510 for performing a necessary processing on the raised portions 22 and 32 of the members 20 and 30 subjected to friction stir welding and to an upper face of the welding bead.

Other constructions of the friction stir welding apparatus of this embodiment are similar to those of the former embodiment of the present invention as shown in FIG. 1.

The technical range of the present invention is not limited to the descriptions or illustrations of the embodiments or to the descriptions of the means for solving the problems of the prior art, and it is to be understood that the invention is entitled to a range in which the man skilled in this technical field would find to be equivalent.

As stated above, according to the present invention, the friction stir welding apparatus has a function in which the center of the welding portion is detected using an optical sensor, and the output of the optical sensor is used to make the center of the rotary tool follow the center of the welding portion so as to effect position control of the whole welding head.

Further, the optical sensor is arranged ahead of the rotary tool in the welding direction and the light beam is irradiated to locate the joint to be friction stir welded by optically detecting the position of the two members to be joined. In this friction stir welding apparatus, the optical sensor is covered with a partial cover so that entry of the generated chips in the area of the optical sensor can be prevented.

The cover has a plate shape and is constituted by a side face plate which covers one side portion, that is disposed in parallel to the advancing direction of the welding head, of the box shaped optical sensor, and a rear face plate, which is folded at the obtuse angle relative to the side face plate and covers the rotary tool side of the optical sensor housing.

Further, at the leading face portion of the optical sensor housing, an air nozzle is provided, and an air jet is injected toward the outside from the inside of the cover. This air jet is injected to the outside from the lower portion of the trailing face plate of the cover in such a way that entry of the generated chips to the optical sensor side can be prevented.

Further, the air jet which has collided with the inner face of the cover is deflected by the trailing face plate of the cover and is blown off to the side portion in which the optical sensor housing is opened. Accordingly, the entry of the generated chips into the beam portion of the optical sensor is prevented, so that the degree of accuracy of the optical sensor can be improved.

Further, the pressing roller units, which are provided at the front and the rear portions of the welding head, each have an air nozzle, so that chips on the members to be subjected to the friction stir welding can be removed, which eliminates possible damage to the surface of the members to be subjected to the friction stir welding by the pressing roller.

What is claimed is:

1. A method of manufacturing a structural body comprising the steps of:
    relatively moving a cutting means along a welded joint formed by welding abutting members;
    guiding said cutting means using sensing means disposed ahead of said cutting means in a moving direction of said cutting means for cutting away a portion of said welded joint;
    providing a partitioning member between said cutting means and said sensing means for partitioning said sensing means and said cutting means and
    in an area of said welded joint between said cutting means and said sensing means, directing a jet of air from a front portion of said area in said moving direction to a rear portion of said area or from a lateral portion toward said moving direction in said area.

2. A method of manufacturing a structural body according to claim 1, characterized in that the air is caused to flow out to an oblique side portion relative to said moving direction along the surface of said partitioning member which is provided between said sensing means and said cutting means.

3. A method of manufacturing a structural body according to claim 2, characterized in that air is caused to flow out toward a rear portion of said sensing means from a front portion of said sensing means.

4. A method of manufacturing a structural body according to claim 1, characterized in that said cutting means is installed at a side face of a friction stir welding rotary tool; and accompanying the friction stir welding, cut-out of a portion of said welded joint is carried out by said cutting means.

5. A method of manufacturing a structural body comprising the steps of:
    relatively moving a cutting means along a welded joint formed by welding abutting members;
    guiding said cutting means using sensing means disposed ahead of said cutting means in a moving direction of said cutting means for cutting away a portion of said welded joint; and
    in an area of said welded joint between said cutting means and said sensing means, directing a jet of air from a front portion of said area in said moving direction to a rear portion of said area or from a lateral portion toward said moving direction in said area;
    providing rolling means for pressing said members to be subjected to welding behind said cutting means; and
    between said rolling means and said cutting means, causing air to flow out in said moving direction or toward the side relative to said moving direction.

6. A method of manufacturing a structural body according to claim 5, characterized in that a second rolling means for pressing said members to be subjected to welding is provided ahead of said cutting means; and toward a front portion in said moving direction from said rolling means, air is caused to flow out toward said front portion or said lateral portion relative to said moving direction from said second rolling means.

7. A method of manufacturing a structural body according to claim 1, characterized in that, air is caused to flow out in an oblique direction relative to said moving direction along said partitioning member which is provided between said sensing means and said cutting means.

8. A method of manufacturing a structural body according to claim 7, characterized in that air is caused to flow out toward a rear portion of said sensing means from a front portion of said sensing means.

9. A method of manufacturing a structural body according to claim 1, characterized in that air is caused to flow out from a front portion of said sensing means through a gap between said sensing means and said welded joint.

10. A method of manufacturing a structural body according to claim 1, characterized in that air is caused to flow out in said lateral direction through a gap between said sensing means and said welded joint.

11. A method of manufacturing a structural body comprising the steps of:
    relatively moving a cutting means along a welded joint formed by welding abutting members;
    guiding said cutting means using sensing means disposed ahead of said cutting means in a moving direction of said cutting means for cutting away a portion of said welded joint;
    pressing said members using rolling means disposed behind said cutting means relative to said moving direction; and
    in area of said welded joint between said rolling means and said cutting means, directing air into said area in said moving direction or in a lateral direction relative to said moving direction.

12. A method of manufacturing a structural body comprising the steps of:
    relatively moving a cutting means along a welded joint formed by welding abutting members;

guiding said cutting means using sensing means disposed ahead of said cutting means in a moving direction of said cutting means for cutting away a portion of said welded joint;

providing a partitioning member between said cutting means and said sensing means for partitioning said sensing means and said cutting means;

pressing said members using rolling means disposed behind said cutting means relative to said moving direction; and causing air to flow out forward or to a side relative to said moving direction from said rolling means.

13. A friction stir welding apparatus for forming a structural body comprising:

a bed for fixedly supporting members to be subjected to welding;

a head for carrying out friction stir welding of said members by moving along said bed, said head including a rotary tool having a burr removing cutting means thereon;

sensing means having a housing and being provided in front of said rotary tool in the advancing direction of said head for detecting a center position where a welded point between said members is located; a cover for shielding said housing of said sensing means, said cover comprising a first portion positioned between said sensing means and said rotary tool and a second portion connected to said first portion and which is positioned along a side of said sensing means along said moving direction; and an air nozzle which is positioned said sensing means for injecting an air jet toward a surface of said second portion below said sensing means.

14. A friction stir welding apparatus according to claim 13, characterized in that said first portion which is positioned between said rotary tool, and said sensing means is inclined relative to said moving direction.

15. A friction stir welding method for forming a structural body comprising the steps of:

abutting raised portions of two members, each having said raised portion along an abutting edge portion thereof;

carrying out a friction stir welding using a rotary tool which is inserted into a welding joint of said members from a side of said raised portion and which has a large diameter portion and a small diameter portion;

providing a cutting means which is installed on said large diameter portion of said rotary tool near said small diameter portion of said rotary tool and which projects in a radial direction therefrom, a rotational radius of said cutting means being larger than a half width of said two raised portions; and during the friction stir welding, using said cutting means to cut out said raised portions between an apex of said raised portion and the outer face of said members spaced from said raised portion.

\* \* \* \* \*